(12) United States Patent
Ehlers (10) Patent No.: US 7,226,496 B2
(45) Date of Patent: Jun. 5, 2007

(54) SPOT VENTILATORS AND METHOD FOR SPOT VENTILATING BATHROOMS, KITCHENS AND CLOSETS

(75) Inventor: Gregory Allen Ehlers, Newport Richey, FL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 11/288,746

(22) Filed: Nov. 29, 2005

(65) Prior Publication Data

US 2006/0112828 A1 Jun. 1, 2006

Related U.S. Application Data

(60) Provisional application No. 60/632,225, filed on Nov. 30, 2004.

(51) Int. Cl.
*B03C 3/68* (2006.01)
(52) U.S. Cl. .................. 95/2; 95/70; 95/74; 96/18; 96/25; 96/31; 96/39; 96/55; 454/237
(58) Field of Classification Search .................. 96/18, 96/19, 24, 25, 30, 31, 55, 74, 96, 97, 39; 95/2–4, 7, 70, 73, 74; 361/230–235; 454/237
See application file for complete search history.

(56) References Cited

U.S. PATENT DOCUMENTS

| | | | |
|---|---|---|---|
| 2,765,975 | A | 10/1956 | Lindenblad |
| 2,795,401 | A | 6/1957 | Cooper et al. |
| 3,503,348 | A | 3/1970 | Dvirka |
| 3,504,482 | A | 4/1970 | Goettl |
| 3,638,058 | A | 1/1972 | Fritzius |

(Continued)

FOREIGN PATENT DOCUMENTS

CA 2117222 9/1995

(Continued)

OTHER PUBLICATIONS

The Sharper Image, SI857 OzoneGuard Professional Series Ionic Breeze Quadra Silent Air Purifier, pages printed from website, date last visited Nov. 14, 2005, 5 pages, http://www.sharperimagebest,com/si857.html.

(Continued)

*Primary Examiner*—Richard L. Chiesa
(74) *Attorney, Agent, or Firm*—Reinhart Boerner Van Deuren P.C.

(57) ABSTRACT

A spot ventilator and method for spot ventilating a localized environment of a building is provided. The spot ventilator includes a passage and at least one corona discharge apparatus. The passage extending between an inlet positioned in the localized environment and an outlet. The at least one corona discharge apparatus positioned in relation to the passage such that a fluid from the localized environment is drawn into the passage through the inlet and is expelled through the outlet. The method of ventilating a localized environment of a building includes the steps of sensing a first change in the localized environment, energizing a corona discharge apparatus to produce an electric wind, drawing air from the localized environment into a passage via the electric wind and expelling the air from the passage through the outlet.

21 Claims, 3 Drawing Sheets

U.S. PATENT DOCUMENTS

| | | | |
|---|---|---|---|
| 3,699,387 A | | 10/1972 | Edwards |
| 3,751,715 A | | 8/1973 | Edwards |
| 3,973,927 A | * | 8/1976 | Furchner et al. ............... 95/3 |
| 4,076,011 A | | 2/1978 | Proulx |
| 4,210,847 A | | 7/1980 | Shannon et al. |
| 4,231,526 A | | 11/1980 | Ortner et al. |
| 4,231,766 A | | 11/1980 | Spurgin et al. |
| 4,343,776 A | | 8/1982 | Carr et al. |
| 4,380,720 A | | 4/1983 | Fleck |
| 4,405,507 A | | 9/1983 | Carr et al. |
| 4,643,745 A | | 2/1987 | Sakakibara et al. |
| 4,675,029 A | | 6/1987 | Norman et al. |
| 4,694,817 A | | 9/1987 | Nilsson |
| 4,789,801 A | | 12/1988 | Lee |
| 4,812,711 A | * | 3/1989 | Torok et al. ............ 315/111.91 |
| 4,955,991 A | * | 9/1990 | Torok et al. ................ 96/50 |
| 5,042,997 A | * | 8/1991 | Rhodes ...................... 96/18 |
| 5,055,115 A | * | 10/1991 | Yikai et al. ................ 96/59 |
| 5,071,455 A | | 12/1991 | Abedi-Asl |
| 5,077,500 A | | 12/1991 | Török et al. |
| 5,144,941 A | | 9/1992 | Saito et al. |
| 5,422,331 A | | 6/1995 | Galligan et al. |
| 5,667,564 A | | 9/1997 | Weinberg |
| 5,702,244 A | | 12/1997 | Goodson et al. |
| 5,958,112 A | * | 9/1999 | Nojima ...................... 96/55 |
| 6,129,781 A | | 10/2000 | Okamoto et al. |
| 6,152,977 A | | 11/2000 | D'Evelyn |
| 6,176,977 B1 | | 1/2001 | Taylor et al. |
| 6,287,368 B1 | * | 9/2001 | Ilmasti ........................ 96/19 |
| 6,375,902 B1 | | 4/2002 | Moini et al. |
| 6,375,905 B1 | | 4/2002 | Moini et al. |
| 6,464,754 B1 | * | 10/2002 | Ford .......................... 95/26 |
| 6,504,308 B1 | | 1/2003 | Krichtafovitch et al. |
| 6,508,982 B1 | * | 1/2003 | Shoji ......................... 422/22 |
| 6,635,106 B2 | * | 10/2003 | Katou et al. ................ 96/67 |
| 6,664,741 B1 | | 12/2003 | Krichtafovitch |
| 6,699,529 B2 | | 3/2004 | Garner et al. |
| 6,727,657 B2 | | 4/2004 | Krichtafovitch et al. |
| D499,476 S | | 12/2004 | Holderfield et al. |
| D500,848 S | | 1/2005 | Holderfield et al. |
| D501,042 S | | 1/2005 | Holderfield et al. |
| 6,920,874 B1 | | 7/2005 | Siegel |
| 2001/0032544 A1 | * | 10/2001 | Taylor et al. ................ 96/19 |
| 2003/0024487 A1 | | 2/2003 | Hughes |
| 2003/0090209 A1 | | 5/2003 | Krichtafovitch et al. |
| 2003/0234618 A1 | | 12/2003 | Krichtafovitch |
| 2004/0004440 A1 | | 1/2004 | Krichtafovitch et al. |
| 2004/0004797 A1 | | 1/2004 | Krichtafovitch et al. |
| 2004/0155612 A1 | | 8/2004 | Krichtafovitch |
| 2004/0183454 A1 | | 9/2004 | Krichtafovitch |
| 2004/0212329 A1 | | 10/2004 | Krichtafovitch et al. |
| 2004/0217720 A1 | | 11/2004 | Krichtafovitch et al. |
| 2005/0011512 A1 | | 1/2005 | Bachinski et al. |
| 2005/0214186 A1 | | 9/2005 | Michalakos et al. |
| 2006/0112708 A1 | | 6/2006 | Reaves |
| 2006/0112829 A1 | | 6/2006 | Ashworth |
| 2006/0112955 A1 | | 6/2006 | Reaves |
| 2006/0113398 A1 | | 6/2006 | Ashworth |
| 2006/0114637 A1 | | 6/2006 | Ashworth |
| 2006/0125648 A1 | | 6/2006 | Young |

FOREIGN PATENT DOCUMENTS

| | | | | |
|---|---|---|---|---|
| CA | 2370966AA | | 12/2000 | |
| JP | 61134524 A | | 6/1986 | |
| JP | 362057662 A | | 3/1987 | |
| JP | 63201437 A | | 8/1988 | |
| JP | 01312340 A | | 12/1989 | |
| JP | 02215037 A | | 8/1990 | |
| JP | 4-55121 | * | 2/1992 | ............... 95/73 |
| JP | 410043628 A | | 2/1998 | |

OTHER PUBLICATIONS

YET2.COM, NoZone The Intelligent Air Freshener, pages printed from website, date last visited Nov. 14, 2005, 2 pages, http://www.yet2.com/app/list/techpak?id=36127&sid=360&abc-0.

Engelhard, PremAir catalyst now part of The Sharper Image's Ionic Breeze Air Purifiers, page printed from website, date last visited Nov. 14, 2005, http://www.engelhard.com/Lang1/xDocID1EF8CDE1FB754A8788E84A989F41EA6C/xDocTablec_Cas.

Lara A. Gundel, Douglas P. Sullivan, Gregory Y. Katsapov, William J. Fisk, A pilot study of energy efficient air cleaning for ozone, report, Indoor Environment Department Environmental Energy Technologies Division Lawrence Berkeley National Laboratory, University of California, Nov. 28, 2002, 15 pages, posted at the eScholarship Repository, University of California, http://repositories.cdlib.org/lbnl/LBNL-51836.

* cited by examiner

SPOT VENTILATORS AND METHOD FOR SPOT VENTILATING BATHROOMS, KITCHENS AND CLOSETS

CROSS-REFERENCE TO RELATED PATENT APPLICATIONS

This patent application claims the benefit of U.S. Provisional Patent Application No. 60/632,225, filed Nov. 30, 2004, the teachings and disclosure of which are hereby incorporated in their entireties by reference thereto.

FIELD OF THE INVENTION

This present invention relates generally to ventilation systems, and more particularly to spot ventilation systems for use in bathrooms, kitchens and closets.

BACKGROUND OF THE INVENTION

Traditional bathroom and kitchen ventilation systems may be classified generally as spot ventilation systems or spot ventilators, which are localized ventilation systems that remove pollutants quickly from their source as they are generated. They can be used whether or not a whole house ventilation system or natural ventilation system is used to substantially improve air quality.

These spot ventilators are typically either a ducted ventilator or a recirculating ventilator. In each type of ventilator, a fan is used to draw in air from an environment. A ducted ventilator exhausts the air from the point of installation, preferably to the outside. In a recirculating ventilator, the air is passed through a series of filters to remove odors and airborne particulates before the air is exhausted back into the environment from which the air was originally drawn. The exhaust method of removing the air from the point of the ventilation system to the outside in the ducted ventilator is the most effective method of removing contaminates from the building of the two installations. The filtration method of recirculating air typically uses a series of particulate trapping filters and often incorporates an active charcoal filter, odor-absorbing medium, or other air-borne contaminate removing filter.

While both types of systems have been in use since the invention of the fan, neither system addresses the issues created by improvements in energy efficiency, airtight buildings, energy saving envelope shields and closed cell insulation building wraps. Today's new homes and buildings achieve energy efficiency through better insulation and maintaining an essentially airtight enclosure. While these energy efficiency features conserve our natural resources and eliminate waste, they create an environment where stale air, mold, odors and gasses can accumulate, creating an unhealthy environment. Furthermore, the use of fans generates noise, uses rotating parts, requires a larger housing, has a high operating cost, and cannot act to filter the air that is moved.

There exists, therefore, a need in the art for a new and improved spot ventilator that may be used in bathrooms, kitchens, closets, etc. that takes these issues into account and that improves the efficiency and effectiveness of such systems.

BRIEF SUMMARY OF THE INVENTION

In view of the above, the system and method of the present invention addresses the issues of diminished air quality in various environments, such as bathrooms, kitchens, etc. However, as will become apparent to those skilled in the art, the present invention is also applicable in any other applications where its use would improve the overall air quality of a dwelling, premise, business, commercial or industrial setting. An example of such a use would be to install the system in a bedroom closet where air circulation, sanitization, air exchange and odor removal would improve the overall environment and protect the investment in the owner's wardrobe. Other applications include but are not limited to locker rooms at gyms, country clubs and other athletic operations. Such other embodiments will be well understood by those skilled in the art in view of the following description, and therefore the description of the operation of the present invention in any particular environment is presented by way of example and not by way of limitation.

A preferred embodiment of the present invention utilizes corona discharge technology, such as ion wind acceleration to exhaust or circulate air from the environment. In an embodiment, a system and method for monitoring and improving air quality of residential and commercial environments such as restrooms, kitchens, closets and locker rooms by ventilation, recirculation and/or sanitation is presented. This includes but is not limited to the control of and neutralization of gases, odors, humidity and airborne particulates. In one embodiment, continuous air circulation and exchange is provided. Preferably, a processor is included. Such a monitor may sense explosive or flammable vapors, levels of CO, CO2 and other harmful gases, smoke, etc. Such an embodiment may also include a means to maintain safe levels and/or initiate alarms. In an alternate embodiment of the present invention, an air heating system is included.

In a preferred embodiment of the present invention, an air exchange system utilizes a processor, a plurality of sensors and ion wind particle acceleration technology to recirculate or exhaust the air from the site of the air exchange system, through a ducted air transport system. The sensors may include occupancy, humidity, CO, CO2, radon, methane, propane, smoke, natural gas, formaldehyde, bio-toxins, viruses, bacteria, mold spores, mildew spores, smoke, dust, dander, mites and any of a plurality of other sensors for gasses or airborne contaminants. In a highly preferred embodiment, the air exchange system includes the ability to extract water from the exchanged air stream. The dehumidified air is then directed back into the site of the air exchange system while the high humidity air is vented either outside or to another location within the premises, depending on the season and the need to maintain or limit humidity content.

The air exchange system of a preferred embodiment can be activated automatically by the processor and sensors, by manual means, or it may operate in a continuous fashion using schedules, cyclical run patterns, cost of energy criteria, weather factors, time-of-day factors or any other schedule of run criteria that may combine the sensor and time data within the process to determine the optimal operational run criteria. Preferably, the air exchange system of the present invention, when operating in a occupancy sensor mode, may delay operation for some minimal period of time and then continue operation for some period of time following the vacancy of the occupancy sensing area. The air exchange system of the present invention, when operating in a sensor driven mode, may utilize a low volume air exchange process to improve the operation of the sensors, improving the overall responsiveness of the system.

The air exchange system of the present invention can operate totally on a manual basis, can be activated manually and then manage the air exchange process in an automated fashion, or can operate in a totally automatic fashion. The air exchange system of a preferred embodiment, if utilized in an enclosed area with little or no air circulation, may utilize a cyclical or continuous operating mode under the control of the processor. This mode may also utilize the particulate removal capabilities as well as the dehumidification capabilities of the exchange system, and may include any number of special and general-purpose sensors to achieve optimal operational characteristics. In a highly preferred embodiment of the present invention used in a recirculating air system, the air exchange system will utilize its ability to oscillate the return air stream electronically to stimulate better overall air circulation properties in the defined air exchange space.

In a further embodiment of the present invention, the air exchange system uses the capabilities of a corona discharge apparatus to neutralize gases, attract and capture airborne particulates and capture and destroy spores, viruses and bacteria. As a result, cleaning of the corona discharge apparatus is necessary and requires either a manual removal and cleaning process or an automated process. The automated process may include reversing the power to the corona discharge apparatus to dispel any captured particulate material. Preferably this cleaning process utilizes a waste dump ducting system to the outside or a waste collection chamber to capture all gathered waste particulate matter. In one embodiment, the air exchange system of the present invention can electronically determine the degree of particulate it has accumulated and when it needs to be cleaned. This can generate a manual alarm condition, initiate an automated cleaning cycle, or a combination of both. Automatic cleaning will require periodic servicing of the waste capture chamber on re-circulating air embodiments.

A spot ventilator in accordance with the present invention can continuously vary the volume of air passing through the spot ventilator based on the needs of the implementation. A spot ventilator of the present invention will preferably monitor and maintain an acceptable level of ozone within the defined air exchange space. In one embodiment, such ozone reduction is provided by the inclusion of an ozone depletion apparatus that breaks down, absorbs, or otherwise reduces the amount of ozone produced or passed by the corona discharge apparatus.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
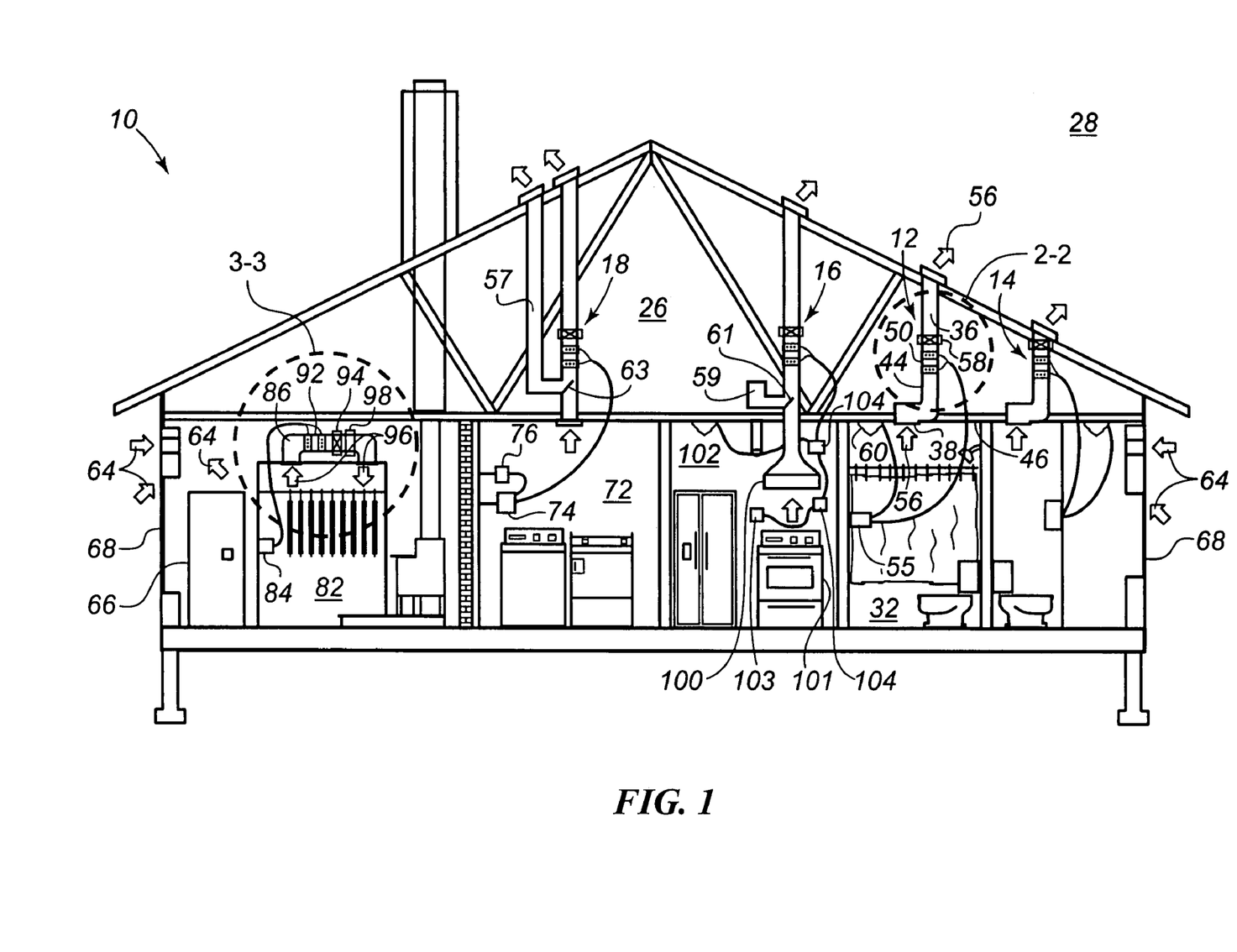
FIG. 1 is a simplified diagram of a building having several embodiments of spot ventilators in accordance with the present invention, the spot ventilators including corona discharge apparatuses.

Referring to FIG. 1, a building 10 incorporating numerous spot ventilators according to the present invention is illustrated. Particularly, the building 10 incorporates numerous spot ventilators 12, 14, 16, 18 for selectively exhausting air from the interior 26 of the building 10 to the exterior 28 of the building 10. The building 10 further incorporates a spot ventilator 30 according to the present invention that selectively recirculates and filters the air within the interior 26 of the building 10. The drawings are illustrative in nature and should not be interpreted to restrict the design of the spot ventilators to any specific size, shape, form or configuration.

In an embodiment of the present invention, the spot ventilator 12 is associated with a bathroom 32 of the building 10. The spot ventilator 12 includes a passage 36 extending between an inlet 38 and an outlet 40. The passage 36 provides fluid communication between the interior 26 and exterior 28 of the building 10. Because this spot ventilator 12 communicates the interior 26 with the exterior 28 such that air is exhausted/expelled from the bathroom 32, it is a type of ducted ventilator. The passage 36 is defined by a system of metal ductwork 44. The ductwork 44 has a smooth interior surface to provide limited resistance to the air flowing through the passage 36. Furthermore, the ductwork 44 is sealed and connected together with mastic or other like sealing adhesives such that fluid passing through the passage 36 does not leak or escape from the passage 36. The inlet 38 is typically in the form of a metal or plastic grate or vent mounted to the ceiling 46 of the bathroom 32. The inlet 38 could be located in and/or mounted to a wall or the floor rather than the ceiling. The inlet 38 may be either flush mounted to the ceiling 46 or protrude from the ceiling 46.

Figure 2:
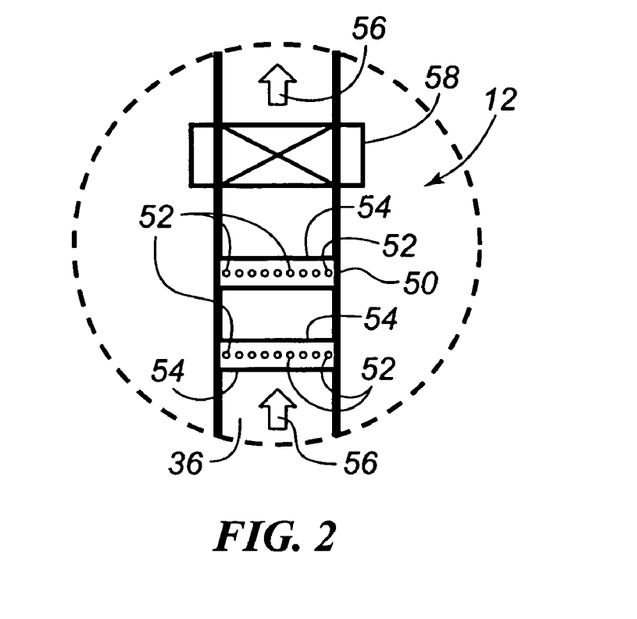
FIG. 2 is a partial illustration of an embodiment of the spot ventilators of FIG. 1 further illustrating corona discharge apparatus for producing ion wind to move and ventilate.

As shown in FIG. 2, the spot ventilator 12 further includes a solid state corona discharge apparatus 50 for moving the air from the bathroom 32 through the passage 36 and exhausting it to the exterior 28 of the building 10. The corona discharge apparatus 50 drives/draws the air through the passage 36. As will be more fully explained below, the use of a corona discharge apparatus eliminates any moving parts, provides quieter operation, saves energy, saves space and improves air quality.

The corona discharge apparatus 50 is preferably located in-line with the ductwork 44. The typical corona discharge apparatus 50 employs numerous corona discharge electrodes 52 arranged in arrays and spaced apart from numerous negatively charged attracting electrodes 54 that are also arranged in arrays. When assembled into an array, the corona discharge electrodes 52 can be referred to as an emitter array. Likewise, the attracting electrodes 54 can be referred to as a collector array. Due to the many array configurations and electrode shapes that can be used, the arrays of the corona discharge electrodes 52 and the attracting electrodes 54 have been shown in FIG. 2 in a simplified form.

Each of the corona discharge electrodes 52 and attracting electrodes 54 is coupled to and charged by a high-voltage power supply (not shown). The electrodes 52, and 54 are also preferably monitored, controlled and/or managed by related control electronics such as a processor 55 (FIG. 1). In addition, the corona discharge electrodes 52 are typically asymmetrical with respect to the attracting electrodes 54. In one embodiment, the corona discharge electrodes 52 are highly curved and resemble the tip of a needle or a narrow wire while the attracting electrodes 54 take the form of a flat plate or a ground plane. The curvature of the corona discharge electrodes 52 ensures a high potential gradient around that electrode.

For the most part, the high potential gradient generated at or near the corona discharge electrodes 52 pulls apart the neutral air molecules in the immediate area. What remains after each neutral air molecule has been dismantled is a positively charged ion and a negatively charged electron. Due to the strong electric field near the corona discharge electrode 52, the ion and electron are increasingly separated from each other, prevented from recombining, and accelerated in opposite directions. Therefore, the ion and electron are both imparted with kinetic energy. Moreover, because a portion of the air molecules in the passage 36 near the corona discharge apparatus 50 is ionized, the ionized air in the passage 36 becomes a conducting medium, the circuit including the corona discharge electrodes 52 and the attracting electrodes 54 is completed, and a current flow can be sustained.

The negatively charged electrons are persuaded to move toward the positively charged corona discharge electrodes 52 due to the difference in charge between them. When the rapidly moving and accelerating electrons collide with other neutral air molecules in the area, further positive ion/electron pairs are created. As more and more positive/ion electric pairs are produced, an electron avalanche is established. The electron avalanche sustains and/or perpetuates the corona discharge process.

In contrast to the negatively charged electrons, the positively charged ions are persuaded to move from near the corona discharge electrodes 52 toward the attracting electrodes 54. This movement is due to the difference in charge between the positively charged ions and the negatively charged attracting electrodes. Like the electrons, when the positively charged ions move they also collide with neutral air molecules. When they collide, the positively charged ions can transfer some of their momentum as well as excess charge to the neutral air molecules. Therefore, the neutral air molecules are knocked toward the attracting electrode 54 or are ionized and then drawn to the attracting electrode. In either case, the positively charged ions and other air molecules end up flowing from the corona discharge electrodes 52 toward the attracting electrodes 54.

The movement or flow of the air particles away from the corona discharge electrodes 52 and toward the attracting electrodes 54 causes or results in what is referred to by those skilled in the art as an electric wind, ion wind or electrostatic fluid acceleration. In the illustrated embodiment of FIG. 1, the electric wind generated by the stale air corona discharge apparatus 50 travels through the passage 36 in a direction depicted by arrows 56.

The velocity and volume of the air moving through the passage 36 is proportional to the voltage difference between the electrodes 52, 54 and the size of the arrays of the corona discharge apparatus 50. By varying the potential difference between the electrodes 52, 54, the size and dimensions of the passage 36, and the like, the velocity and volume of the electric wind can be increased and decreased over a continuous range as desired. In this embodiment, the processor 55 (FIG. 1) controls the potential difference between the electrodes 52, 54. However, the range may be manually adjusted with a simple adjustment switch, knob, remote control and the like to provide either continuous or discrete velocities. With the appropriate configuration, air flows exceeding six hundred cubic feet per minute are possible.

When the positively charged ions creating the electric wind reach the attracting electrodes 54, the positive charge is removed by permitting a recombination of the negatively charged electrons with the positively charged ions. Due to the recombination, a neutral air molecule once again exists in the passage 36. Advantageously, these neutral air molecules retain their velocity and direction.

In a preferred embodiment, the corona discharge apparatus 50 can be used for cleaning and scrubbing the air passing through the passage 36, respectively. As known to those skilled in the art, contaminants and particles tend to adhere to the attracting electrode 54 during the corona discharge process. Therefore, the air passing through the passage 36 can be purified. Notably, the attracting electrodes 54, which are often plates, are preferably removable to permit inspection, cleaning, and replacement. In an alternative embodiment, the entire corona discharge apparatus 50 is removable.

In a further alternative embodiment, the negative charge of the attracting electrode 54 is selectively changed to a positive charge to repel any contaminants or particles that adhere to the attracting electrode 54. As shown in an alternative spot ventilator 18 in FIG. 1, embodiments that utilize this cleaning process use a waste exhaust passage 57 to exhaust the waste collected by the spot ventilator 18 to the exterior 28 of the building 10. Alternatively, a waste collection chamber 59 may be incorporated into a spot ventilator 16 to capture all gathered waste particulate matter. Furthermore, these spot ventilators 16, 18 in which cleaning is provided by reversing the charge of the attracting electrode, the cleaning could be automated such that the processor controlling the spot ventilators 16, 18 would include sensors to determine that the attracting electrodes are dirty and would automatically initialize the cleaning. To prevent the contaminants from being expelled into the building, the spot ventilators 16, 18 include dampers 61, 63 that close the portion of the passages connected to the interior of the building 10. These dampers 61, 63 can be selectively and automatically controlled by the processors for the spot ventilators 16, 18 during the cleaning process.

An alternative method of cleaning the collectors which is not illustrated would be to include a third grid of electrodes beyond the primary set. This third grid in a cleaning cycle would take the place of the second grid and the second would take the place of the first. By shifting positions, the reverse charge would be applied to the second grid which would now become the primary grid and the third grid would become the collector or secondary grid. In the cleaning process, the air movement would continue in the same direction but all particulate collected on the second grid would be released and now collect on the third grid. Following a period of cleaning, all particulate that has been transferred to the third grid can now be exhausted by shifting energy back to the primary first and second grids while de-energizing or pulsing a primary charge into the third grid. This transfer and exhaust cycle can be implemented with both the traditional exhaust or recycling air movement devices provided a damper system in the recycling systems is provided to direct the ejected particulate either outside or into an appropriate collection means.

As is known in the art, several patents and published applications have recognized that corona discharge devices may be used to generate ions and accelerate and filter fluids such as air. Such patents and published applications that describe fluid and/or air moving devices and technology include the following U.S. Pat. Nos. 3,638,058, 3,699,387, 3,751,715, 4,210,847, 4,231,766, 4,380,720, 4,643,745, 4,549,801, 5,077,500, 5,667,564, 6,176,977, 6,504,308, 6,664,741, and 6,727,657 and U.S. Pub. Pat. Applns. 2004/0217720, 2004/0212329, 2004/0183454, 2004/0155612, 2004/0004797, 2004/0004440, 2003/0234618, and 2003/0090209. The teachings and disclosure of each of these patents and published applications are incorporated in their entireties by reference thereto.

While other ion discharge or corona fluid movement technologies may be employed in the system and method of the present invention, a preferred embodiment of the present invention utilizes the technology described in one or more of the preceding patents and/or published applications, and most preferably, the technology described in U.S. Pat. Nos. 6,504,308, 6,664,741, and 6,727,657 issued to Kronos Advanced Technologies, Inc., of Belmont, Mass. The teachings and disclosures of each of these patents are also incorporated in their entities by reference thereto.

Furthermore, in a preferred embodiment, the spot ventilator 12 further comprises an ozone depletion apparatus 58 for reducing the amount of ozone in the air as shown in FIG. 1. In general, the ozone depletion apparatus 58 is any system, device, or method having the ability to degenerate ozone into oxygen molecules (i.e., dioxide) and/or absorb ozone. In particular, the ozone depletion apparatus 58 can be a filter, a catalyst composition situated proximate the air flow, and the like. When the spot ventilator 12 is equipped with the ozone depletion apparatus 58, the ozone generated by the corona discharge apparatus 58 can be maintained below a desired level, relegated to within a predetermined range, and otherwise managed.

The ozone depletion apparatus 58 is preferably disposed within the passage 36 proximate the corona discharge apparatus 50. As shown, the ozone depletion apparatus 58 is generally downstream of the corona discharge apparatus 50. As such, air flowing out of the outlet 40 is purified by the ozone depletion apparatus 58 prior to being exhausted from the building 10.

As is known in the art, several patents have recognized that ozone depletion devices and systems may be used to convert ozone to oxygen (i.e., dioxide), absorb ozone, and the like. Such patents that describe converting and absorbing devices, methods, and technology include the following U.S. Pat. Nos. 4,343,776, 4,405,507, 5,422,331, 6,375,902, 6,375,905, and 6,699,529. The teachings and disclosure of each of these patents are incorporated in their entireties by reference thereto.

As shown in FIG. 1, the spot ventilator 12 incorporates a processor 55 for controlling the corona discharge apparatus 50. The processor 55 in an embodiment is capable of controlling the spot ventilator 12 as well as monitoring changes in the environment of the bathroom 32. In this embodiment, the processor 55 incorporates associated sensors and mechanical and electronic controls into a single integrated module, integrated chip, or node capable of independently managing and controlling the spot ventilator 12. The sensors incorporated in the processor 50 are adapted to sense changes in the environment of the spot ventilator 12, namely the bathroom 32.

Particularly, the processor 55 and corresponding sensors would monitor changes in occupancy, odor, humidity, mold, mildew, the air-borne contaminants/particulate or other parameters that affect the overall air quality of the bathroom's environment. The processor 55 of the invention resides in a location best suited to monitor and manage these environment conditions and changes. This positioning is best determined by one experienced in the art to ensure it performs to its optimum capabilities.

If changes in the environment are sensed, the processor 55 controls the spot ventilator 12 accordingly. The occupancy activation feature is enabled by the use of a sensor for determining presence of an occupant, which could be but is not limited to thermal, motion or sonic sensing or any other method of detecting the presence of a person or other physical entity.

The processor 55 is configurable to delay activation of the spot ventilator 12 based on a minimum occupancy time expiring before it is activated. This feature prevents the spot ventilator 12 from needlessly exhausting air from the bathroom 32 before the air quality has changed significantly enough to warrant ventilation thereby conserving energy. In addition, the processor 55 can optionally activate a light 60 in the bathroom 32 upon occupancy of the bathroom 32. Activation of the light 60 can be additionally controlled independently of the spot ventilator 12 by use of a switch permitting it to have no delay in activation. The same sensing and control feature can be configured to cease operation of the spot ventilator 12 or the light 60, at the same time, independent of one another, when the occupancy sensor can no longer detect the presence of a person or other physical entity or after a predetermined length of time.

This is beneficial in the situation where the processor detects that no person is in the bathroom such that the light 60 should be turned off, but that the air quality in the bathroom 32 requires that the spot ventilator 12 continue to exhaust air from the bathroom 32.

The processor 55 is additionally configurable to activate the spot ventilator 12, namely the corona discharge apparatus 50, when changes in other environmental parameters are sensed. The processor 55 will activate the corona discharge apparatus 50 such that air within the bathroom is exhausted from the environment until the air in the environment is returned to a suitable condition such that all environmental parameters that are being monitored/sensed are below a desired level, relegated to within a predetermined range, and/or otherwise managed.

For purposes of the invention, the words "exchange" and "exhaust" can be generally used interchangeably and will be deemed to include exhausting air from within the building to the exterior of the building, the exchange of indoor air with replacement fresh air, the process of air recirculation and filtration within the environment with no exhaust feature or any combination thereof.

In an embodiment, the processor 55 is programmed to activate the spot ventilator 12 such that a level of continuous air exchange is provided. This continuous air exchange may be low in volume or high in volume to meet the individual needs of the application. In yet a further embodiment of the present invention, the spot ventilator 12 can optionally be programmed to operate in a pulse mode which differs from the continuous mode in that the amount of air being exchanged is selectively varied to conserve energy when the application does not require a continuous or high rate of air exchange or transfer. By including either a continuous of pulsed airflow means into the design there is an increased likelihood that any gas or substance to be sensed will have the optimal opportunity to pass by or through a sensor because the air will not remain stagnant within the environment.

Use of the spot ventilators of the previously disclosed embodiments would also encompass but not be limited to gymnasiums, exercise facilities, indoor pools, golf courses, garages, club locker rooms, etc.

In application, the air quality within the bathroom 32 is maintained through the exchange of indoor air with replacement air entering the bathroom 32 from another location. After the processor 55 and corresponding sensors sense a change in the environment, the processor 55 activates/energizes the corona discharge apparatus 50 to exhaust air from the bathroom 32. Exhausted air is replaced by other air from within the building 10 which eventually must be replaced by air from the exterior 28 of the building 10 which is indicated by arrows 64. The replacement air 64 enters either through openings around doors 66 and windows 68 or through other passages in the building 10. Some amount of fresh air exchange will always be needed to maintain a healthy indoor environment, especially the management of CO and CO2 levels.

In an alternative embodiment, the sensing and processing components of the spot ventilator could be separate discrete components. As shown in FIG. 1, the spot ventilator 18 located in the laundry room 72 includes a processor 74 that is discrete and separate from the environment sensors 76. Having the sensors 76 and processor 74 independent and separate components allows one skilled in the art the flexibility of positioning the sensors 76 in an ideal location for sensing the changes in the environment while the processor 74 would be most ideally positioned to operate the spot ventilator 18 as well as being accessible to an occupant.

Ventilation within a closet requires a unique air exchange program based on its contents, location within the building, as well as a myriad of other factors that would influence the programming of the air exchange needs. This is particularly true because many closets have limited natural air circulation as a result of being an enclosed space that is typically small, having limited access and typically being closed off from the rest of the building. The limited and poor air circulation can result in stale air, mold, mildew and their associated odors. Because closets typically do not experience a rapid change in air quality such as a bathroom having rapid increases in humidity during showering, it is not as necessary to completely exhaust the air from the building 10.

Thus, in an embodiment of a spot ventilator 30 for a closet 82 of the building 10, the spot ventilator 30 is a recirculating ventilator. A processor 84 controls the spot ventilator 30 and supports any one of or a combination of time-of-day programming, fixed daily run times, cyclical on and off programming, continuous operation modes, continuous variable speed operating modes, operational modes based on the price of energy, operational modes based on external factors which include but are not limited to the weather including temperature, humidity, heating and cooling degree days, relative humidity and the air quality index.

Figure 3:
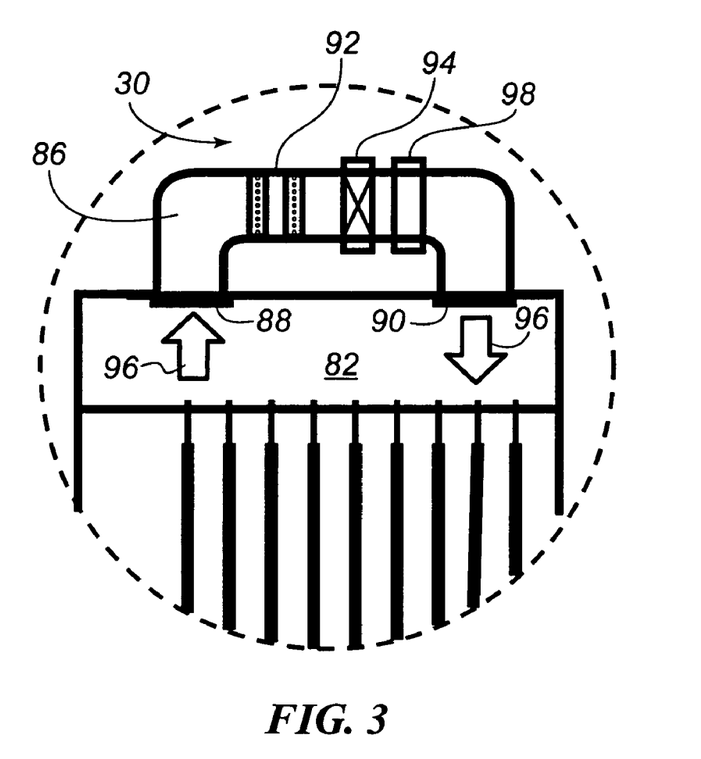
FIG. 3 is an enlarged partial illustration of a recirculating spot ventilator of FIG. 1 in a closet in accordance with another embodiment of the present invention.

As best seen in FIG. 3, the spot ventilator 30 is similar to the spot ventilators previously discussed. It includes a passage 86 that extends between an inlet 88 and an outlet 90. Furthermore, it includes a corona discharge apparatus 92 for drawing air through the passage and an ozone depletion device 94 downstream from the corona discharge apparatus 92.

However, in the illustrated recirculating spot ventilator 30, the passage 86 does not create fluid communication between the interior 26 and exterior 28 of the building 10. Rather than being exhausted from the building 10, the air passing through the spot ventilator 30, indicated by arrows 96, is exhausted back into the closet 82. Rather than removing stale air from the closet 82, the recirculating spot ventilator 30 circulates the air and prevents it from remaining stagnant for an extended period of time. Furthermore, the illustrated embodiment of the recirculating spot ventilator 30 passes the air through filters 98 to maintain and control environmental parameters below a desired level, relegated to within a predetermined range, and/or otherwise managed.

These embodiments of spot ventilators may further incorporate methods or devices to control the humidity within the closet 32. These methods will be more fully explored below.

This embodiment is not limited to domestic, commercial or industrial room spaces and could also be applicable to appliance applications or other units or measure. An example of this would be a refrigerator, which has a defined internal area where over time air quality could diminish as a result of odors released by items stored in the refrigerator, spoiled items emitting noxious or toxic fumes or an imbalance in the air chemistry resulting form the oxygen and water molecules in the air reacting chemically with items stored in the unit. Those skilled in the art can quickly identify how this application will easily also fit into a plurality of other applications form food storage bins to clothes hampers.

As shown in FIG. 1, a further embodiment of a spot ventilator includes a hood 100 for a range 101. As illustrated, the hood 100 is a ducted spot ventilator 16 that exhausts air from the kitchen 102 to the exterior 28 of the building 10. In an alternative embodiment of a hood for a range consistent with the present invention, the hood 100 could be a recirculating spot ventilator operating much the same way as the spot ventilator 30 for the closet 82. This alternative recirculating embodiment is more suitable for retrofitting a kitchen with a range hood when a passage to exhaust air to the exterior of the building does not already exist.

The hood 100 may also incorporate a processor 103 and sensors 104 to monitor the kitchen's air quality. As shown these components are separate individual components. It is contemplated that the sensors and/or the processor are directly integrated into the hood 100. By directly integrating the sensors and/or processor directly into the hood, retrofitting of a kitchen using the disclosed spot ventilator is further simplified.

In the kitchen 102, potentially high levels of humidity potentially, CO and CO2 may be present as a result of cooking or other like processes taking place which also generate high levels of odors and potentially dangerous gases. The sensors may also include occupancy, methane, propane, smoke, natural gas, formaldehyde, bio-toxins, viruses, bacteria, mold spores, mildew spores, smoke, dust, and any of a plurality of other sensors for gasses or airborne contaminants. The hood 100 may further include humidity controlling technology as discussed below.

Figure 4:
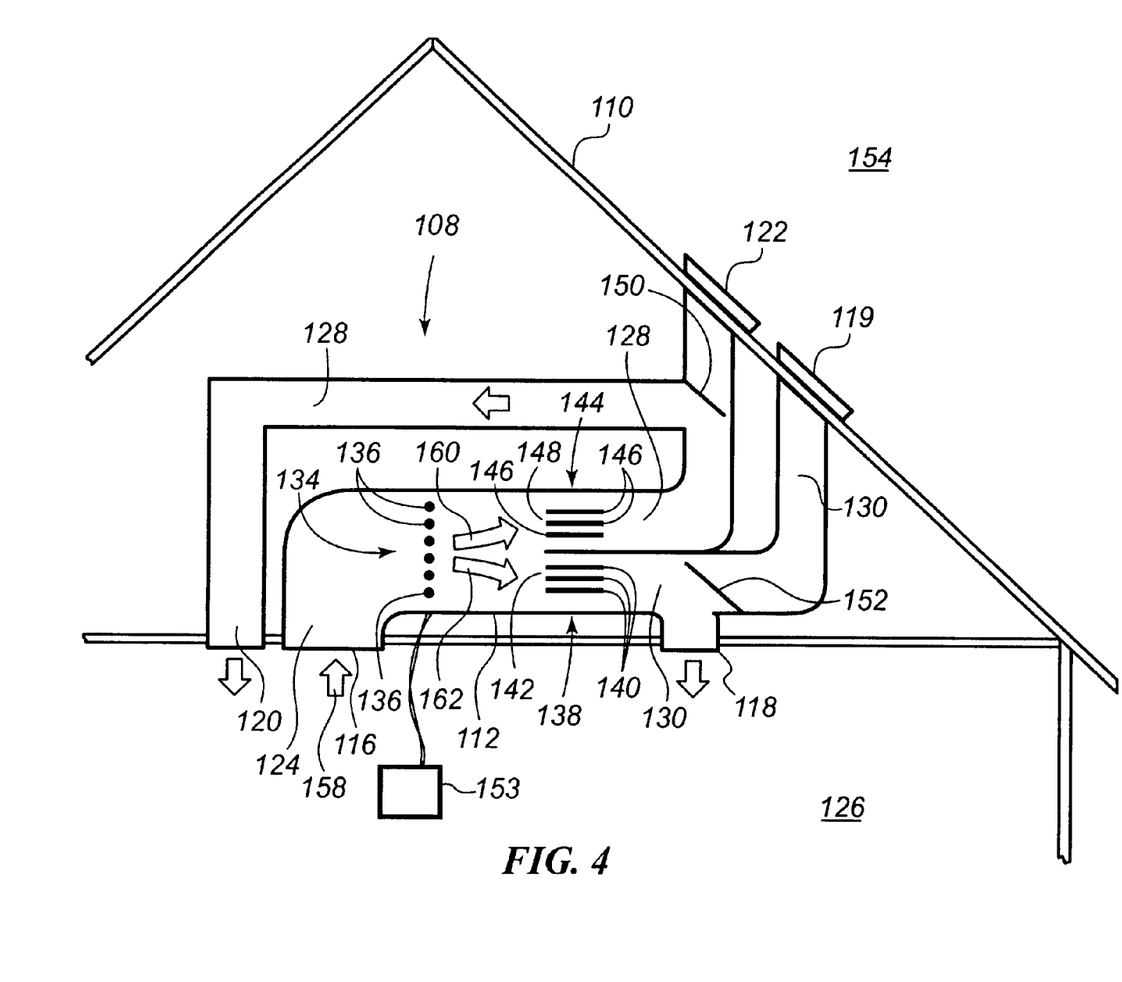
FIG. 4 is a simplified diagram illustrating an embodiment of a spot ventilator of the present invention having a humidity control/return system.

A further embodiment of a spot ventilator 108 within a building 110 is illustrated in FIG. 4. It is a scientific fact that by reducing humidity levels by 10% in hot climates, the air conditioning or cooling temperature can be raised by 3 degrees without any noticeable change in comfort. In a similar but opposite fashion, by increasing the relative humidity by 10% in cold climates, heating temperatures can be decreased by 3 degrees without any noticeable impact on comfort. It is therefore an important energy conservation feature and benefit of the spot ventilator and method of this embodiment to manage humidity in the most appropriate manner depending on the season and outside weather to gain the most energy efficient results for the premise in which it is installed. The spot ventilator 108 of this embodiment performs any number of the functions described in association with the previous embodiments, but further includes mechanisms to direct and separate a portion of the flow of humidity through the spot ventilator 108 for selectively exhausting the humid air out of the environment or back into the environment.

The spot ventilator 108 of this embodiment includes a corona discharge apparatus 112 to drive air through the spot ventilator 108. Also included is a main air inlet 116 and humid air return outlet 118, humid air exhaust outlet 119, dry air return outlet 120, and dry air exhaust outlet 122. An inlet passage 124 is upstream from and the corona discharge apparatus 112 and extends between the main air inlet 116 in fluid communication with the environment 126 being ventilated and the corona discharge apparatus 112. A dry air outlet passage 128 and humid air outlet passage 130 extend downstream from the corona discharge apparatus 112.

More particularly, the inlet passage 124 is upstream from the emitter array 134 of the corona discharge apparatus 112 and extends between the main air inlet 116 and the corona discharge apparatus 112. The emitter array 134 as explained with previous embodiments comprises numerous positively charged corona discharge electrodes 136. A first collector array 138 including a first set of negatively charged attracting electrodes 140 are located at the inlet portion 142 of the humid air outlet passage 130. A second collector array 144 including a second-set of negatively charged attracting electrodes 146 are located at the inlet portion 148 of the dry air outlet passage 128. The first and second collector arrays 138, 144 are located horizontally spaced from the emitter array 134. Furthermore, the first collector array 138 is vertically below the second collector array 144. As is shown in FIG. 4, the inlet 142 of the humid air passage 130 is located vertically below the inlet of the dry air passage 128.

The dry air passage 128 includes a first damper 150 and the humid air passage 130 includes a second damper 152 that can be selectively positioned, oriented, and controlled by a processor 153 such that dry air or humid air is selectively returned to the environment 126 while exhausting the other air to the exterior 154 of the building 110.

In operation, air from the environment 126 is drawn into the spot ventilator 108 at main air inlet 116 by the corona discharge apparatus 112 as depicted by arrow 158. As the air passes through the corona discharge apparatus 112, drier air (depicted by arrow 160) is drawn through the second collector array 144 and air having a higher humidity content (depicted by arrow 162) is drawn through the first collector array 134. The separation of dry air and humid air is established because the humid air tends to settle within the passage. The flow of air through the corona discharge apparatus is preferably laminar for best dry air/humid air separation.

As in warmer seasons when it is preferable to retain the dry air 160 in the building 110, the processor 153 will control the first damper 150 such that the dry air is prevented from flowing to the dry air exhaust outlet 122 but may flow to the dry air return outlet 120. In this situation, the second damper 152 in the humid air passage 130 will be oriented to prevent the humid air 162 from flowing to the humid air return outlet 118 but the humid air may flow to the humid air exhaust outlet 119. Thus the humid air is exhausted to the exterior 154 of the building 110. If it is preferable to retain the humid air 162 within in the building 110, the processor 153 controls the first and second dampers 150, 152 such that the opposite results will occur. Namely, humid air 162 will exit the spot ventilator 108 through the humid air return outlet 118 and dry air will exit the spot ventilator 108 through the dry air exhaust outlet 122 and be exhausted from the building 110.

The disclosed embodiments of the present invention may be used for any number of residential, commercial or industrial settings. Residential setting would include but not be limited to workshops, garages and hobby rooms, bathrooms, kitchens, closets, and the like. These embodiments may also be used in cars, motor homes or campers.

The use of a processor to control the operation of the spot ventilator to move air in any of these applications provides the optional ability to dynamically control its operation based on a plurality of conditions or changes in the operating environment which include but are not limited to the items which follow. These may be implemented individually or in any combination to meet the specific needs of the application or problem being addressed. An example of this control functionality of the processor would be in the case of a sensed fire in a premise. The unit would optionally be configured to shut down to reduce the air circulation or to operate at its maximum capability based on its design and configuration.

The operation of the spot ventilators can also be controlled based on a specific schedule using any one of a combination of the following: a clock, a calendar, a means to compute sun rise and sun set or an external trigger mechanism.

The operation of the disclosed embodiments, namely activating, deactivating, or controlling the corona discharge apparatus of the disclosed embodiments, can also be controlled in response to inputs from sensors for gases or airborne contaminants such as but not limited to CO, $CO_2$, NOX, Methane, Propane, Natural Gas, Radon, Formaldehyde, Bio-toxins, Viruses, Bacteria, Mold Spores, Mildew Spores, Smoke, Dust, Dander, Mites and any of a plurality of other gasses or airborne contaminants.

The operation of corona discharge apparatus of the disclosed embodiments can also be controlled using inputs from atmospheric sensors. Examples of these would be but are not limited to humidity sensors to detect the presence of abnormal levels of water vapor or steam (i.e., cooking steam or high humidity resulting from a bath or shower operating), heat or temperature sensors to detect high temperature or thermal levels (i.e., range hood detection of cooking surface temperature rise based on use).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A spot ventilator for maintaining air quality of a localized environment within a building, the building having an interior and an exterior, the spot ventilator comprising:
    a passage extending between an inlet positioned in the localized environment and an exterior outlet positioned in fluid communication with the exterior of the building and an interior outlet positioned in the localized environment;
    at least one corona discharge apparatus positioned in relation to the passage such that a fluid from the localized environment is drawn into the passage through the inlet and is selectively expelled into one of the localized environment through the interior outlet or the exterior of the building through the exterior outlet.

2. The spot ventilator of claim 1, further comprising:
    at least one sensor for sensing changes in the localized environment; and
    a processor operatively coupled to the at least one sensor for selectively activating the at least one corona discharge apparatus in response to sensed changes in the environment.

3. The spot ventilator of claim 1, wherein the at least one corona discharge apparatus comprises at least one emitter array in spaced relation to at least one collector array, and the at least one collector array comprises a first collector array positioned vertically below a second collector array, the first and second collector arrays being horizontally spaced from the at least one emitter array, and wherein the passage includes a first passage portion and a second passage portion downstream from the emitter array and wherein the first passage portion is positioned vertically below the second passage portion, and wherein the first collector array is positioned in-line with the first passage portion and the second collector array is positioned in-line with the second passage portion, and wherein a first portion of fluid passing through the emitter array passes only through the first collector array and the first passage portion, and wherein a second portion of fluid passing through the emitter array passes only through the second collector array and the second passage portion.

4. The spot ventilator of claim 3, further comprising a plurality of selectively oriented dampers for selectively directing the first portion of fluid to one of the environment and the exterior of the building and selectively directing the second portion of fluid to one of the environment and the exterior of the building.

5. The spot ventilator of claim 2, wherein the processor selectively varies the potential difference across the at least one corona discharge apparatus to selectively vary the flow of fluid drawn through the passage.

6. A spot ventilator for maintaining air quality of a localized environment within a building, the building having an interior and an exterior, the spot ventilator comprising:
    a passage extending between an inlet positioned in the localized environment and an oulet positioned in fluid communication with the exterior of the building; and
    at least one corona discharge apparatus positioned in relation to the passage such that a fluid from the localized environment is drawn into the passage through the inlet and substantially all of the fluid moved by the corona discharge apparatus is expelled through the outlet;
    at least one sensor for sensing changes in the localized environment; and
    a processor operatively coupled to the at least one sensor for selectively activating the at least one corona discharge apparatus in response to sensed changes in the environment; and
    wherein the processor selectively activates the corona discharge apparatus in the localized environment in response to the at least one sensor sensing a change in occupancy of the localized environment.

7. The spot ventilator of claim 6, wherein the at least one sensor and processor are coupled in a unitary module.

8. The spot ventilator of claim 6, further comprising an ozone depletion apparatus positioned in relation to the passage for removing ozone from the fluid drawn therethrough by degenerating the ozone to oxygen molecules prior to exiting through the outlet.

9. The spot ventilator of claim 6, further comprising at least one filter positioned relative to the passage to remove contaminants from the fluid passing through the passage.

10. The spot ventilator of claim 6, wherein the processor further selectively deactivates the at least one corona discharge apparatus after a predetermined period or after a further sensed change in the occupancy of the localized environment.

11. The spot ventilator of claim 6, wherein the at least one corona discharge apparatus comprises at least one positively charged emitter array in spaced relation to at least one negatively charged collector array.

12. The spot ventilator of claim 11, wherein at least one of the emitter array and collector array is adapted to filter the fluid passed through the passage.

13. The spot ventilator of claim 6, wherein the corona discharge apparatus is removably positioned in the passage to allow removal and cleaning thereof.

14. The spot ventilator of claim 6, wherein the processor selectively operates the at least one corona discharge apparatus based on a preprogrammed schedule.

15. A spot ventilator for maintaining air quality of a localized environment within a building, the building having an interior and an exterior, the spot ventilator comprising:
    a passage extending between an inlet positioned in the localized environment and an outlet positioned in fluid communication with the exterior of the building;
    at least one corona discharge apparatus positioned in relation to the passage such that a fluid from the localized environment is drawn into the passage through the inlet and substantially all of the fluid moved by the corona discharge apparatus is expelled through the outlet;

wherein the at least one corona discharge apparatus comprises at least one positively charged emitter array in spaced relation to at least one negatively charged collector array;

wherein at least one of the emitter array and collector array is adapted to filter the fluid passed through the passage; and wherein processor reverses a polarity of the potential difference across the at least one corona discharge apparatus to clean the at least one corona discharge apparatus.

16. A method of ventilating a localized interior environment of a building, comprising the steps of:

sensing a first change in the localized environment;

energizing a corona discharge apparatus to produce an electric wind;

drawing air from the localized environment into a passage via the electric wind; and expelling substantially all of the air of the electric wind from the passage through an outlet to the exterior of the building;

comprising the step of filtering the air;

comprising the step of cleaning the corona discharge apparatus; and wherein the step of cleaning the corona discharge apparatus comprises the steps of de-energizing a first array, reversing a polarity of energization on a second array, and energizing a third array.

17. The method of claim 16, further comprising the step of dehumidifying the air with the corona discharge apparatus.

18. A method of ventilating a localized interior environment of a building, comprising the steps of:

sensing a first change in the localized environment;

energizing a corona discharge apparatus to produce an electric wind;

drawing air from the localized environment into a passage via the electric wind; and expelling substantially all of the air of the electric wind from the passage through an outlet to the exterior of the building; and comprising the step of dehumidifying the air with the corona discharge apparatus, wherein the step of dehumidifying the air comprises the step of separating the air drawn from the local environment into a portion of lower humidity air and a portion of higher humidity air.

19. The method of claim 18, further comprising the step of filtering the air.

20. The method of claim 18, further comprising the step of cleaning the corona discharge apparatus.

21. The method of claim 18, further comprising the steps of:

sensing a second change in the localized environment; and de-energizing the corona discharge apparatus.

* * * * *